Feb. 9, 1932.  O. K. HARLEY  1,844,652
SNAP
Filed Oct. 11, 1930

INVENTOR
Orval K. Harley
BY
Arthur C. Brown
ATTORNEY

Patented Feb. 9, 1932

1,844,652

UNITED STATES PATENT OFFICE

ORVAL K. HARLEY, OF JENKS, OKLAHOMA, ASSIGNOR TO EDNA GIVENS HARLEY, OF JENKS, OKLAHOMA

SNAP

Application filed October 11, 1930. Serial No. 488,001.

My invention relates to fasteners and more particularly to hook or snap fasteners, the principal object of my invention being to provide a device of this character that is especially adapted for readily and firmly securing fish hooks to trot lines.

In accomplishing this and other objects of my invention I have provided improved details of structure the preferred form of which is illustrated in the accompanying drawings, wherein.

Figure 1:
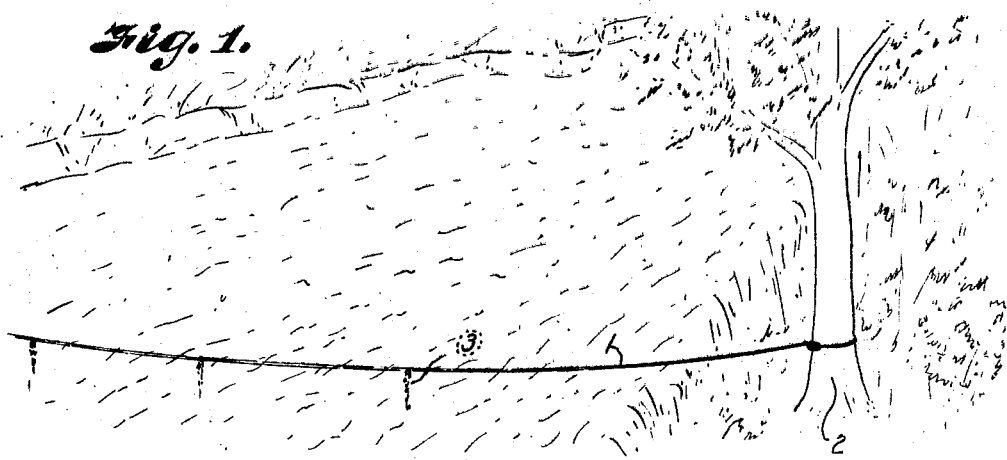
Fig. 1 is a perspective view illustrating a portion of a trot line with hooks, embodying my invention, attached thereto.
Figure 2:
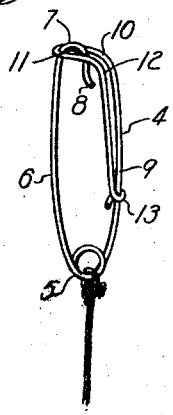
Fig. 2 is a perspective view of the snap.
Figure 3:
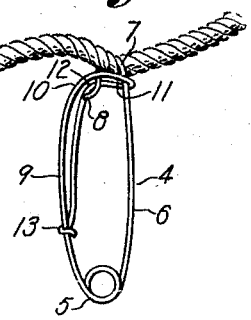
Fig. 3 is a perspective view of the snap secured to a line.

Referring more in detail to the drawings: 1 designates a trot line such as is commonly strung across a body of water and suitably secured at the water's edge, as for example to a tree 2, as shown in Fig. 1.

In order to readily attach to the trot line, a plurality of staging 3, provided with fish hooks on their lower ends as in common practice, I have provided a snap 4, preferably comprising a single strand of wire bent to form a coil 5 at its intermediate portion to serve as a spring, one end of the wire comprising a substantially straight leg 6 bent inwardly at its outer end to form a hook 7 having an outwardly curved end 8.

The opposite end of the fastener likewise comprises a substantially straight leg 9 and is bent sharply, as indicated at 10, to engage one side of the hook portion 7 adjacent its upper edge. It is then bent retractively around the hook to form a resilient loop 11 and its free end is formed complementary to the portion 9 including a sharp bent or shoulder 12, its extreme outer end being wrapped on the straight portion 9, as indicated at 13.

In this manner the hook remains permanently between the loop portion and is normally urged against the outer end of the loop by the spring tension produced by the coil 5.

Figure 4:
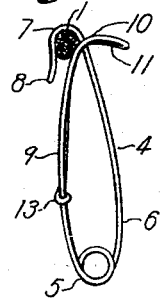
Fig. 4 is an elevational view of the snap illustrating the manner of attaching it to a line.
Figure 5:
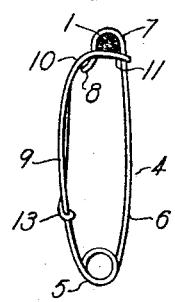
Fig. 5 is a similar elevational view, illustrating the snap attached to the line in latched condition.

In order to attach the hook to a line it is merely necessary to compress the legs 6 and 9, thereby winding the spring portion, as shown in Fig. 4, in order to pass the hook over a line. By exerting a slight pressure to spread the respective ends, the line rides over the shoulders 10 and 12, as shown in Fig. 5, slightly depressing the extreme end of the resilient loop which tends to maintain the hook in latched position. It will be apparent that with the hook secured to the line in this manner it is impossible to slide the hook on the line since, regardless to which side the hook may be moved, a binding effect will result to prevent slippage thereof.

By again compressing the separate legs of the hook, the fastener may be readily disengaged from the line.

While I have described my fastener as being particularly adapted for attaching staging to trot lines, it will be obvious that there are many other uses for which the present invention is well adapted.

What I claim and desire to secure by Letters Patent is:

1. In a fastener of the character described, a pair of yieldingly connected spaced legs, one leg terminating in an inwardly directed hook, the opposite leg terminating in an inwardly and downwardly extending resilient loop portion for receiving said hook, with a portion of the hook projecting above said loop, said portion being increased sufficiently to receive a line by depressing the inwardly extending loop portion.

2. A fastener of the character described comprising a single piece of spring wire including a pair of spaced legs joined at one end, one leg terminating in an inwardly directed hook, the opposite leg being bent inwardly and retractively to form a resilient loop adapted to be depressed by a line carried thereover by the hook to wedge the line between the hook and said loop.

3. A fastener of the character described comprising a single piece of wire including a pair of spaced legs joined by a coiled portion, one leg terminating in an inwardly directed hook having a lower entrance opening, the opposite leg comprising a hook-receiving loop bent inwardly to form shoulders, said legs being normally maintained in spaced relation by the coiled portion and being compressible to permit entrance of a line into the hook to be carried over said shoulders by the hook.

In testimony whereof I affix my signature.

ORVAL K. HARLEY.